United States Patent [19]

Hashimoto et al.

[11] Patent Number: 4,746,992
[45] Date of Patent: May 24, 1988

[54] APPARATUS FOR REPRODUCING VIDEO SIGNALS

[75] Inventors: Seiji Hashimoto, Kanagawa; Tsuguhide Sakata, Tokyo; Akihiko Tojo, Kanagawa, all of Japan

[73] Assignee: Canon Kabushiki Kaisha

[21] Appl. No.: 751,068

[22] Filed: Jul. 2, 1985

[30] Foreign Application Priority Data

| Jul. 3, 1984 | [JP] | Japan | 59-138252 |
| Jul. 3, 1984 | [JP] | Japan | 59-138253 |
| Jul. 3, 1984 | [JP] | Japan | 59-138254 |
| Jul. 3, 1984 | [JP] | Japan | 59-138255 |

[51] Int. Cl.$^4$ .................. H04N 5/782; H04N 9/80
[52] U.S. Cl. .................. 358/310; 358/312; 358/330; 360/10.1; 360/13; 360/33.1; 360/35.1
[58] Field of Search .............. 358/312, 310, 329, 330, 358/21 R, 335, 39, 40; 360/10.1, 13, 9.1, 14.1, 18, 24, 29, 30, 33.1, 35.1

[56] References Cited

U.S. PATENT DOCUMENTS

| 4,429,334 | 1/1984 | Hashimoto et al. | 358/310 |
| 4,468,710 | 8/1984 | Hashimoto et al. | 360/9.1 |
| 4,470,076 | 9/1984 | Arai et al. | 358/312 |
| 4,613,909 | 9/1986 | Tobe | 358/310 |

Primary Examiner—Robert L. Richardson
Attorney, Agent, or Firm—Toren, McGeady & Associates

[57] ABSTRACT

The disclosed reproducing apparatus is capable of obtaining a dubbing signal of high picture quality. In the apparatus a head reads a video signal from a record bearing medium; an interpolation circuit interpolates the video signal read out by the head; and an interpolated signal producing circuit producing the video signal interpolated by the interpolation circuit. A dubbing signal producing circuit is arranged to have a video signal which is read out by the head and is not processed through the interpolation circuit produced outside of the reproducing apparatus as a dubbing signal.

23 Claims, 8 Drawing Sheets

PRIOR ART FIG.1
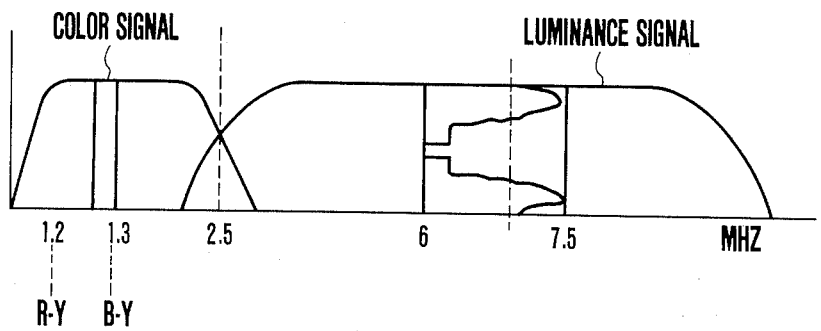
PRIOR ART FIG.2A
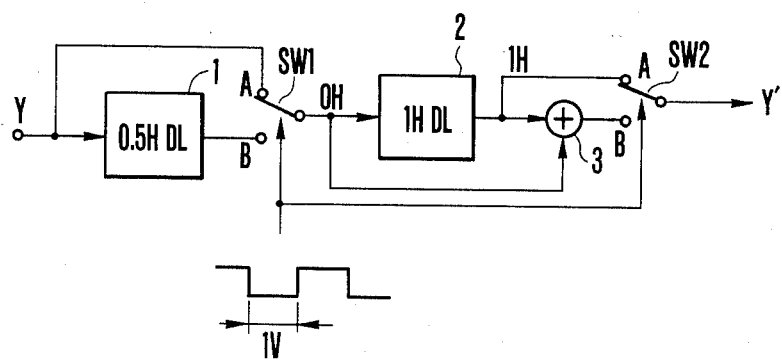
PRIOR ART FIG.2B
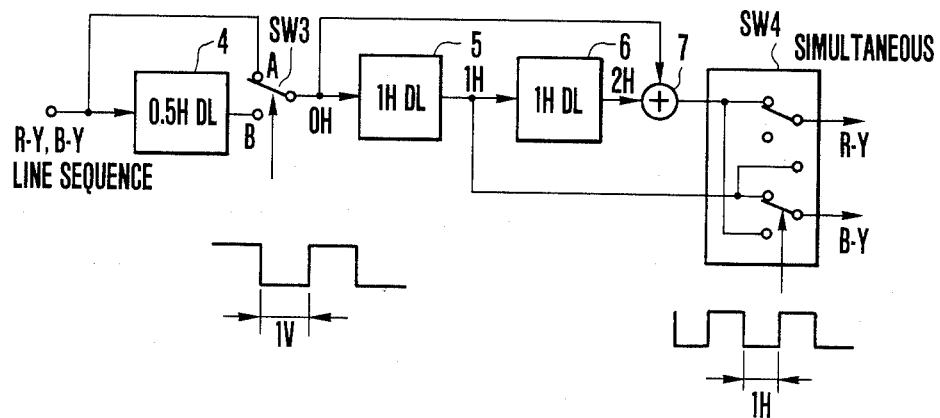

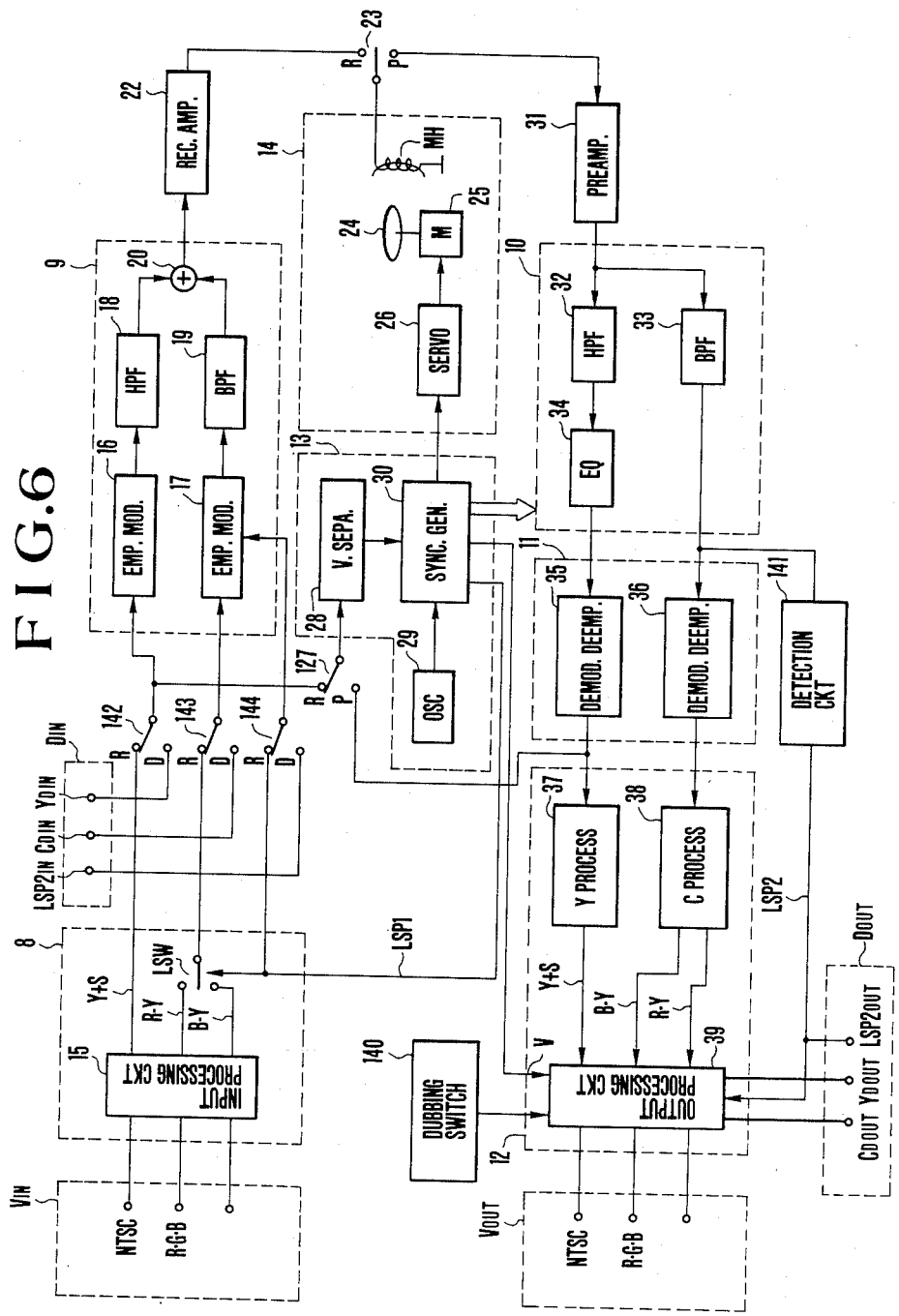
F I G. 6

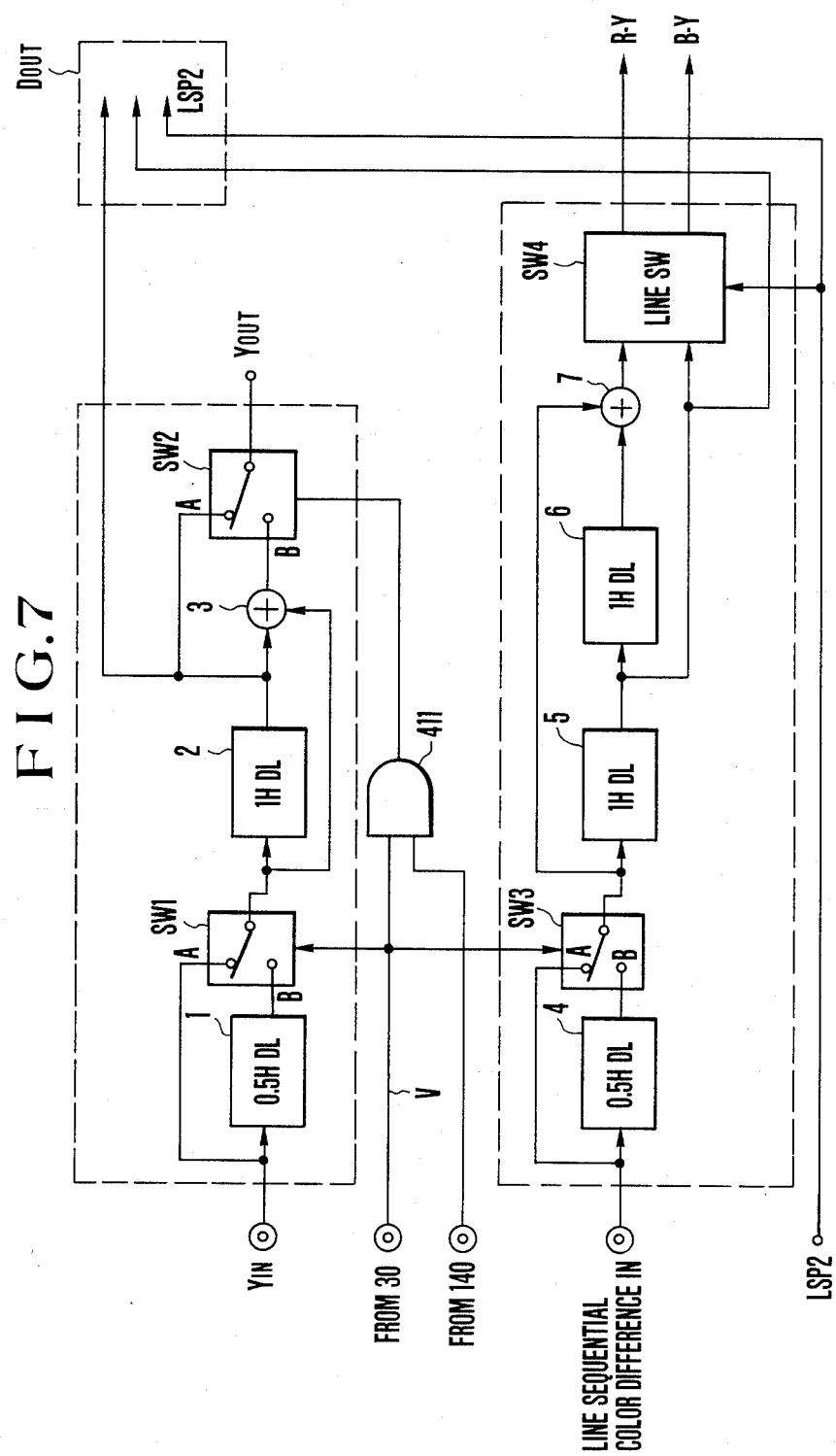

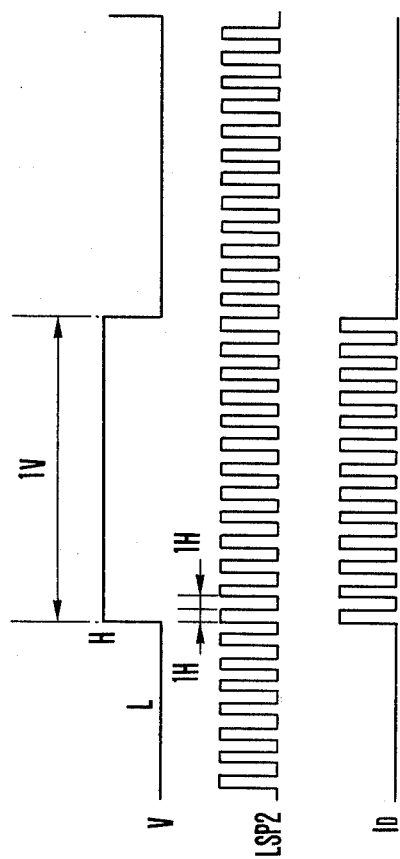

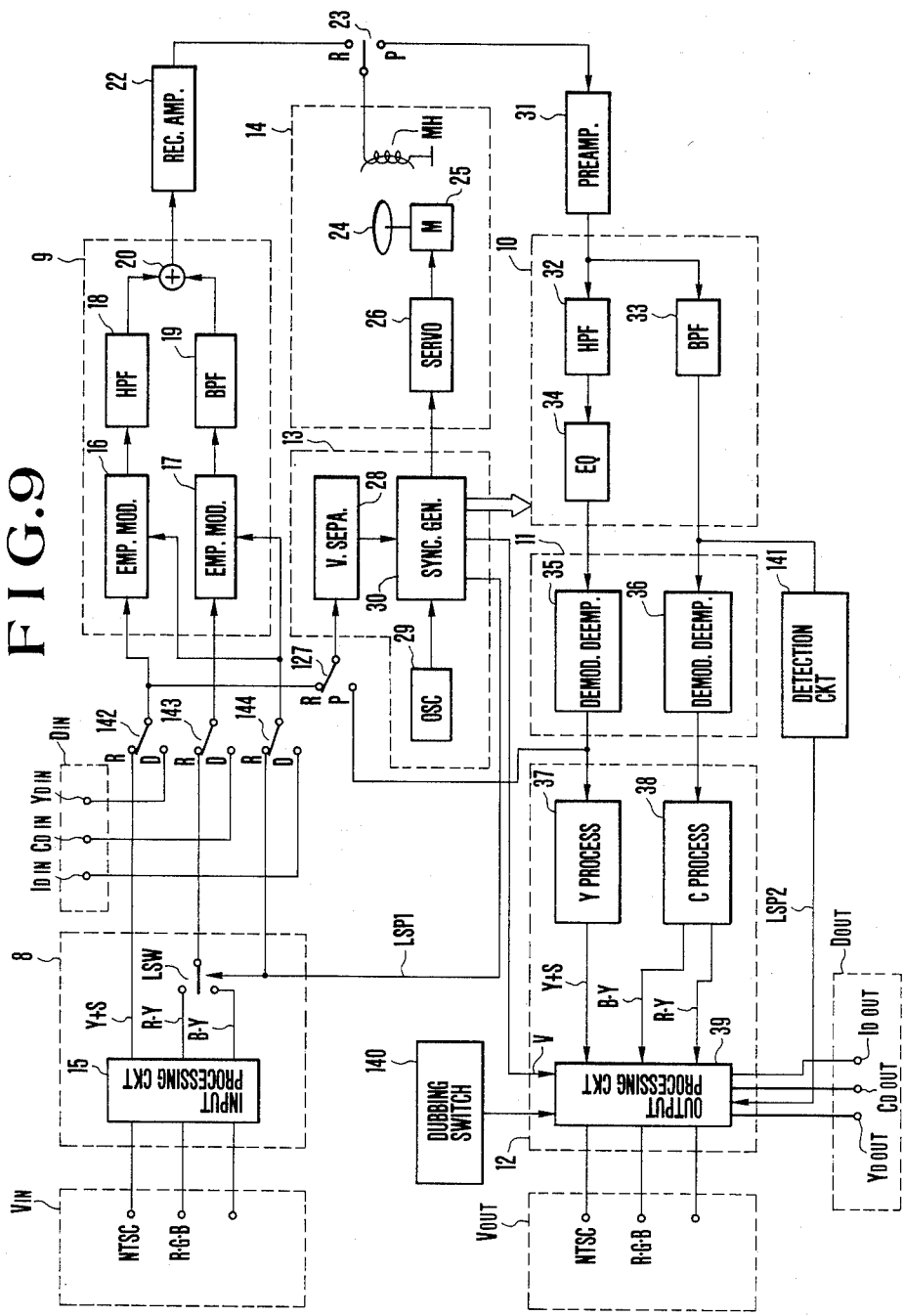

4,746,992

APPARATUS FOR REPRODUCING VIDEO SIGNALS

BACKGROUND OF THE INVENTION

1. Field of the Invention:

This invention relates to a reproducing apparatus which excels in dubbing characteristics.

2. Description of the Prior Art:

Still picture video recording systems (hereinafter call SV systems) record still picture video signals on magnetic discs or other information recording media. The discs or media may, for example, record a luminance signal within a high frequency zone and a color signal within a low frequency zone in a color-difference line sequence, as shown in FIG. 1 of the accompanying drawings, either in the form of a field recording covering just one field or in the form of a frame recording covering two fields.

In a reproducing apparatus, therefore, the color signal must be interpolated to have the line sequential color difference signals converted into concurrent color difference signals. Further, in field recording, the signal must be converted into a frame signal for the purpose of having an interlace display at a monitor. For the conversion, interpolation is generally carried out by averaging horizontal line signals. This method is highly advantageous as it gives improved resolution at the monitor.

In dubbing, however, the above-described interpolating method degrades the resolution. In a standard SV system, the line sequential color difference signals ($B-Y$ and $R-Y$) have an arbitrary phase in the odd- and even-number fields. Further, in field recording, the signal is recorded in either an odd-number field or an even-number field. This shortcoming of the prior art is further described with reference to FIGS. 2A and 2B.

In FIGS. 2A and 2B, the illustrated system includes 0.5 H delay (DL) circuits 1 and 4, with reference symbol H denoting a horizontal period; switch circuits SW1 to SW4; and 1 H delay circuits 2, 5, and 6. These circuits are disposed within an output circuit of a reproducing apparatus which will be subsequently described.

FIG. 2A shows a luminance (Y) signal interpolation circuit. The switches SW1 and SW2 are arranged to be switched over to each other for every field. Accordingly, the input Y signal is produced after having been delayed by 1 H (horizonal period) for a first field. For a next field, the Y signal is skew compensated by the 0.5 H delay circuit 1 and is then averaged with the input and output signals of the next 1 H delay circuit 2 used. As a result, an interpolation signal delayed by 1.5 H is produced from the luminance (Y) signal interpolation circuit.

FIG. 2B shows a color (C) signal interpolation circuit. In this circuit, the switch SW3 and the 0.5 H delay circuit 4 are provided for skew compensation. The 1 H delay circuits 5 and 6 and the switch SW4 change the line sequential color difference signals into concurrent signals. More specifically, the incoming line sequential signals include $R-Y$ and $B-Y$ signals for every H period. Another color difference signal which does not include these signals is made into concurrent signals by averaging (interpolating) 0 H and 2 H signals. Therefore, the concurrent color difference signals are:

$R-Y$: 1 H, ½ (0 H + 2 H), 1 H —

$B-Y$: ½ (0 H + 2 H), 1 H, ½ (0 H + 2 H) —

Accordingly, one of the color difference signals is always produced as an interpolated concurrent signal. Therefore, during the process of dubbing the luminance signal, the interpolated signal might be dubbed in reproducing the information which has been field recorded. Conversely, for the color signal, the interpolated color difference signal is always dubbed. With the dubbing repeated, therefore, the vertical resolution degrades in proportion to the number of repeated dubbings. In horizontal interpolation, the horizontal resolution is similarly degraded.

In having information recorded on a magnetic disc dubbed to another disc, the problem of time base variations arises. A time base variation caused by a motor and a time base variation caused by variations in loads on the disc and a magnetic head result in a small picture distortion in the horizontal direction of a reproduced picture. At present, this is corrected by the AFC characteristic of the display. However, if the time base variations become excessive as the dubbing is repeated, correction is no longer possible.

There is another problem with prior art systems. In the magnetic conversion system of the reproducing apparatus, deterioration of the S/N ratio of a reproduced modulated signal arises from AM noise resulting from a slight difference in touch between the magnetic disc and the magnetic head. This AM noise can be, for example, a sliding noise, the thermal noise of the magnetic head, modulation noise, etc.

The prior art also suffers from deterioration of a high frequency characteristic mainly in the recording and reproducing system, including the magnetic disc and the magnetic head.

SUMMARY OF THE INVENTION

It is a principal object of this invention to provide a reproducing apparatus which is capable of obviating the above-stated shortcomings of the prior art.

A more specific object of the invention is to provide a reproducing apparatus which is capable of minimizing deterioration of resolution.

It is another object of this invention to provide a dubbing apparatus and a method for forming a dubbing signal which are capable of obviating the above-stated shortcomings of the prior art.

It is another specific object of the invention to provide a dubbing apparatus and a method for forming a dubbing signal which are capable of obviating the above-stated shortcomings of the prior art.

It is a further object of the invention to provide a dubbing apparatus and a dubbing signal forming method which are adapted to simplify correction of signal deterioration in carrying out dubbing.

To attain these objects, a reproducing apparatus arranged according to this invention is provided with: a head arranged to read out a video signal from a recording medium; interpolation means for interpolating the video signal read out from the head; interpolation signal producing means for producing a signal obtained through the interpolation means; and dubbing signal producing means for producing outside of the reproducing apparatus as a dubbing signal a video signal which is read out by the head but is not processed through the interpolation means. The reproducing apparatus arranged in this manner is capable of preventing deterioration of resolution in carrying out dubbing, so that a dubbing signal of high quality is recorded.

A dubbing apparatus arranged as another embodiment of this invention is provided with: demodulation means for demodulaing a modulated video signal read out from a recording medium; interpolation means for carrying out an interpolation process on the output of the demodulation means; interpolation signal producing means for producing a signal obtained through the interpolation means; modulation means for modulating the output of the demodulation means obtained without being processed through the interpolation means; and dubbing signal producing means for producing the output of the modulation means to the outside of the dubbing apparatus as a dubbing signal. Such being the arrangement of the embodiment, deterioration of resolution is prevented at the time of dubbing to permit recording of a dubbing signal of high quality. Since the dubbing signal is formed by demodulating the signal obtained from the recording medium and by modulating it after demodulation without having any interpolation process carried out thereon, the dubbing signal is prevented from deteriorating. Therefore, various correction processes such as time correction and a wave form treating process can by simply carried out.

A reproducing apparatus arranged as another embodiment of the invention is provided with: dubbing signal producing means arranged to demodulate modulated line sequential color difference signals read out from a recording medium and to produce them as a dubbing signal; and discrimination signal producing means arranged to form and produce a discrimination signal corresponding to each of the color difference signals. With the reproducing apparatus arranged in this maner, a dubbing signal thus obtained permits the reproduced line sequential color difference signals to be accurately dubbed to give a high quality picture.

A reproducing apparatus arranged as a further embodiment of the invention is provided with: demodulation means for demodulating a modulated video signal read out from a recording medium; interpolation means arranged to periodically form a vertical interpolation signal by using the above-stated video signal; and discrimination signal producing means arranged to produce to the outside of the reproducing apparatus a discrimination signal corresponding to the periodical interpolating action of the interpolation means. The apparatus is thus arranged for carrying out a vertical interpolating process on a reproduced video signal and producing a discrimination signal corresponding to the interpolating action. Therefore, in carrying out dubbing, a video signal which has not undergone the interpolation process can be recorded. The arrangement thus permits dubbing with deterioration of picture quality held to a minimal degree.

The above and further objects and novel features of the invention will become apparent from the following description taken in connection with the accompanying drawings.

BRIEF DESCRIPTION OF THE DRAWINGS

FIG. 1 shows the frequency spectrum of a recording signal obtained in a still picture recording system.

FIG. 2A is a diagram showing by way of example the arrangement of a luminance signal interpolation circuit.

FIG. 2B is a diagram showing by way of example the arrangement of a color signal interpolation circuit.

FIG. 6 is a circuit diagram showing a fourth embodiment of the invention.

FIG. 7 is a circuit diagram showing the essential parts of an output processing circuit.

FIGS. 8A, 8B and 8C are wave form charts showing the wave forms of different discrimination signals.

FIG. 9 is a circuit diagram showing a fifth embodiment of this invention.

DETAILED DESCRIPTION OF THE PREFERRED EMBODIMENTS

Preferred embodiments are arranged as described below with reference to the accompanying drawings.

Figure 3:
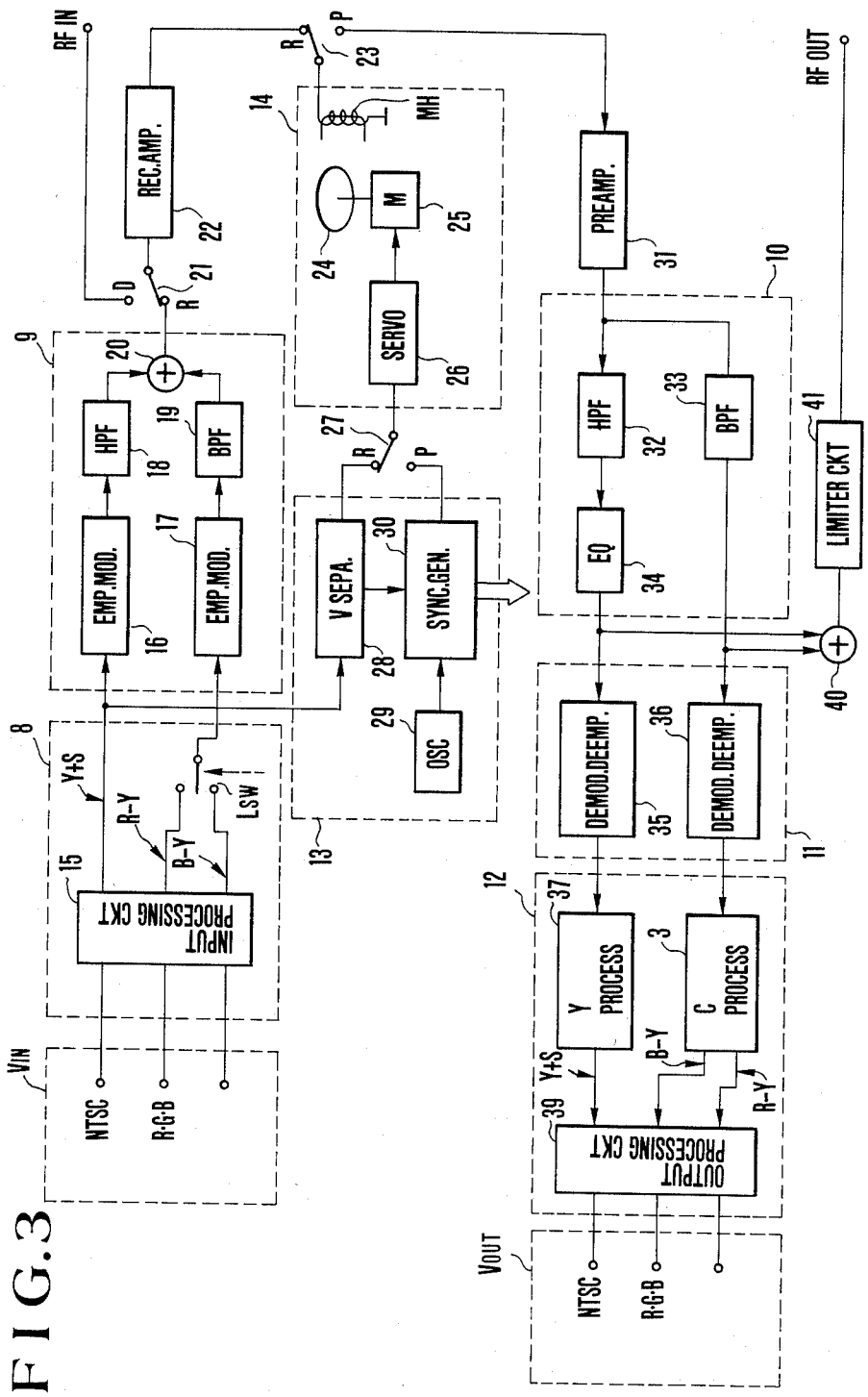
FIG. 3 is a circuit diagram showing a first embodiment of this invention.

FIG. 3 shows an SV system including a reproducing apparatus or a dubbing apparatus arranged according to this invention as a first embodiment thereof. The illustration includes an input processing system 8; a recording processing system 9; a first reproduction processing system 10; a second reproduction processing system 11; an output processing system 12; a synchronizing system 13; a magnetic device system 14; a video signal input terminal VIN; and a video signal output terminal VOUT which serves as an interpolated signal producing means.

In the input processing system 8, an input processing circuit 15 is arranged to perform a wave form treatment process on an NTSC signal, R, G and B signals, or the like coming through the input terminal VIN and to convert the incoming signal into color difference signals. The input processing circuit 15 thus produces a luminance signal (Y+S) including a synchronizing signal (S) and color difference signals (R−Y) and (B−Y). The two color difference signals are switched over from one to the other by a line swtich LSW and is alternately produced at every horizontal period in a line sequential manner. The luminance signal (Y+S) includes the synchronizing signal and the line sequential color difference signals and is respectively modulated by modulation circuits 16 and 17. The modulated luminance signal (Y+S) is supplied via a high-pass filter (HPF) 18 to a recording amplifier 22. The line sequential color difference signals come via a band-pass filter (BPF) 19 to be mixed together by a mixer circuit 20. The mixed color difference signal is supplied via a switch 21 to the recording amplifier 22. The recording amplifier amplifies these input signals. The amplified signals are supplied to a head MH via a switch 23 in a recording mode and then these signals are recorded by the head MH on a disc 24 employed as a recording medium. The disc 24 is driven by a motor 25, which is controlled to rotate at a predetermined speed by a servo control circuit 26.

In the recording mode, a switch 27 is connected on the side of a vertical synchronizing signal separating circuit 28. Therefore, the servo control circuit 26 operates on the basis of a synchronizing signal which is produced from the input processing circuit 15 together with the luminance signal.

In recording a dubbing signal, the switch 21 is connected to one side D thereof. Then, the incoming dubbing signal is amplified through the recording amplifier 22 to become an optimum recording current before it is recorded.

In a reproducing mode, a switch 23 is connected to one side P thereof to allow the signal of the disc 24 to be guided to a pre-amplifier 31 via the head MH.

The output of the pre-amplifier 31 is supplied to an HPF 32 and a BPF 33 respectively. Then, a luminance signal which is modulated through the HPF 32 and color difference signals which are modulated through the BPF 33 are separated.

Following this, the high zone component of the output of the HPF 32 is raised by an equalizer circuit 34 to compensate the deterioration of the high zone characteristic which takes place within the magnetic device system 14.

Then, the output of equalizer circuit 34 and that of the BPF 33 are respectively demodulated by demodulation circuits 35 and 36 to obtain a luminance signal and color difference signals. The outputs of these circuit 35 and 36 are subjected to various wave form treatment processes carried out by Y processing and C processing circuits 37 and 38. After that, they are converted into an NTSC signal, or R, G and B signals, by an output processing circuit 39 which serves as interpolation means. The output processing circuit 39 includes a luminance signal interpolation circuit and a color signal interpolation circuit arranged as shown in FIGS. 2A and 2B. The output processing circuit 39 performs an interpolating operation on the output of the Y signal system to obtain a frame signal from a field signal and on the output of the C signal system to form concurrent color difference signals from the line sequential color difference signals. The NTSC signal, or the R, G and B signals, which have been interpolated by the output processing circuit are produced through an output terminal VOUT.

Further, in the reproduction mode, the servo control circuit 26 is driven in synchronism with the synchronizing signal formed by a synchronizing signal generator 30 on the basis of the output of an oscillator 29.

The output of the equalizer circuit 34 and that of the BPF 33 are mixed by a mixer circuit 40. The output of the mixer circuit 40 is supplied to a limiter circuit 41 to have an AM component noise removed and is then produced as a dubbing signal from an output terminal RFOUT which serves as dubbing signal producing means. The limiter circuit 41 is provided for the purpose of improving an S/N ratio by removing an AM noise, a sliding noise and a thermal noise of the magnetic head of the magnetic device system 14 and a modulation noise. In this specific embodiment, a recording arrangement is formed by the input terminal VIN, the input processing system 8, the recording processing system 9, the dubbing signal input terminal RFIN, the amplifier 22, the magnetic device system 14, the synchronizing system 13, etc. A reproducing arrangement is formed by the magnetic device system 14, the synchronizing system 13, the amplifier 31, a first reproduction processing system 10, a second reproduction processing system 11, the output processing system 12, the video signal output terminal VOUT, the dubbing signal output terminal RFOUT, etc. The magnetic device system 14 and the synchronizing system 13 are used in common by the recording and reproducing arrangement. All the circuit elements shown in FIG. 3 are housed within one and the same casing.

The embodiment is provided with dubbing signal output means for having the reproduced signal produced as a dubbing signal before the signal is interpolated. Therefore, the signal can be dubbed without deterioration of resolution, etc. Further, in the recording arrangement, there are provided the input terminal RFIN and the switch 21 for the purpose of allowing a modulated signal to be recorded as it is by the magnetic head. Therefore, the modulated signal supplied from the reproduction arrangement can be recorded without further modulation.

Figure 4:
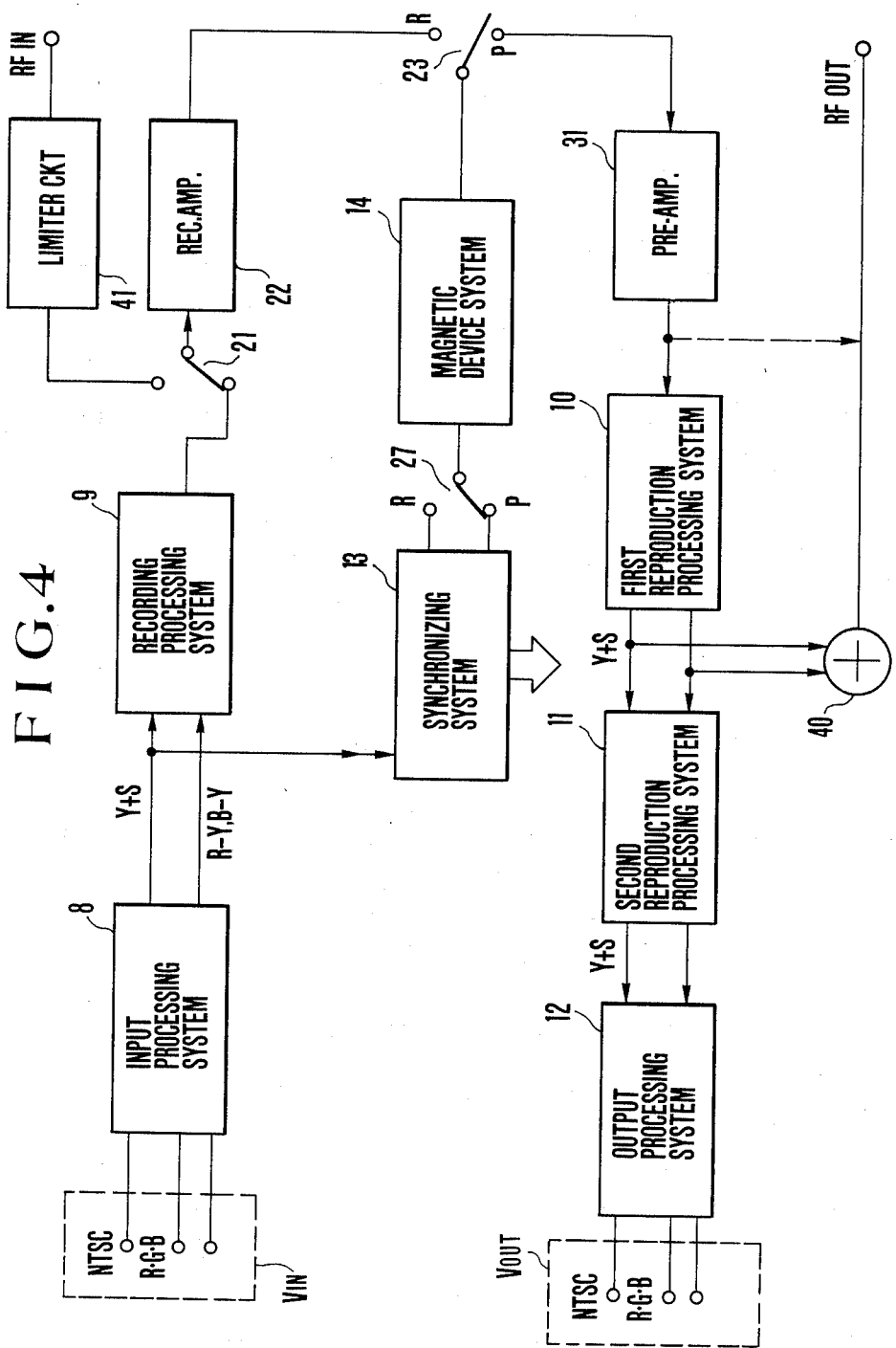
FIG. 4 is a circuit diagram showing a second embodiment of the invention.

FIG. 4 shows a second embodiment of this invention. In this drawing, the same reference numerals are used for denoting the same elements as those shown in FIG. 3. In this case, the limiter circuit 41 is disposed on the input side (RFIN) of the recording arrangement.

In both the first and second embodiments, the output terminal RFOUT may be arranged behind the pre-amplifier 31. Where the adverse effect of the AM noise can be ignored, the limiter circuit 41 may be omitted.

Figure 5:
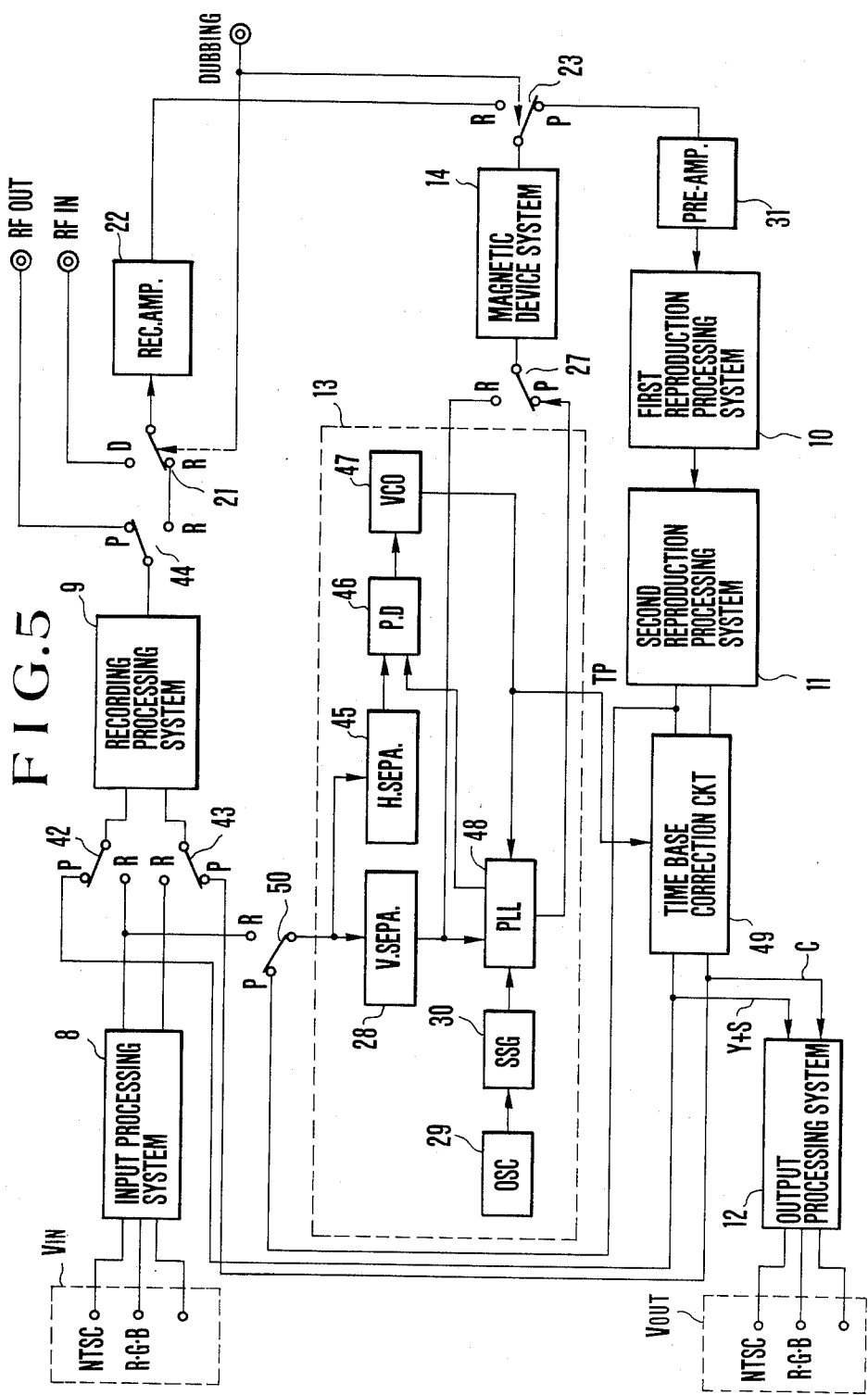
FIG. 5 is a circuit diagram showing a third embodiment of the invention.

FIG. 5 shows a third embodiment of the invention. An RF signal read out by a magnetic device system 14 is demodulated. The demodulated signal is processed to compensate for signal deterioration caused within the magnetic device system 14. After that, the signal is again modulated and is then produced as an RF dubbing signal. The RF dubbing signal thus produced is dubbed on a magnetic disc via an RF input terminal and a pre-amplifier of another recording device. FIG. 5 uses the same reference numerals for denoting the same elements as those shown in FIGS. 1–4. Switches 42–44 and 50 are arranged to be in connection with their sides R in the recording mode and with sides P in the reproduction mode of the embodiment. The embodiment is provided with a horizontal synchronizing signal separating circuit 45; a phase comparison circuit 46, a VCO (voltage-controlled oscillation) circuit 47; a PLL (phase-locked loop) control circuit 48; and a time base correction circuit 49.

The operation for correcting signal deterioration includes the removal of an AM noise, correction of modulation frequency characteristic, correction of time base variations, etc. The above-stated time base variation correction is performed, for example, by means of an analog delay line such as CCD, etc. More specifically, the demodulated signal (the Y+S signal or the line sequential color difference signals) is arranged to be transferred by the time base correction circuit 49 by a pluse signal TP which is modulated to eliminate the time base variations caused by the magnetic device system 14. The CCD driving pulse signal TP is obtained by comparing the phase of a horizontal synchronizing signal separated from the demodulated signal by the circuit 45 with a reference horizontal synchronizing signal obtained from the synchronizing signal generation circuit 30 to obtain a time base variation error signal and then by controlling the VCO circuit 47 in such a way as to cause the value of this error signal to become zero.

In the reproducton mode of this embodiment, a video signal which is once demodulated is compensated for signal deterioration by the second reproduction processing system 11. The signal is then again modulated by the recording processing sytem 9 which includes the modulation circuit disposed on the recording arrangement side. The signal which is thus modulated again is produced as a dubbing signal from the output terminal RFOUT.

The signal processing arrangement mentioned above ensures that an RF signal most suited for dubbing is obtained with signal deterioration compensated.

Further, while this specific embodiment is arranged to perform signal processing for signal deterioration compensation on the side of the RF signal output terminal RFOUT, it may alternately be arranged to be carried out on the side of the RF signal input terminal RFIN. Further, in this embodiment, in modulating the output of the time base correction circuit 49, the recording processing system disposed within the dubbing arrangement is utilized. However, a modulation circuit may be separately arranged for that purpose. Further, the modulation is arranged to be carried out before the dubbing signal is produced from the output terminal RFOUT. However, this arrangement may be replaced with a different arrangement wherein the modulation is not carried out when the dubbing signal is produced but is carried out after the dubbing signal is supplied from the input terminal RFIN.

FIG. 6 shows a fourth embodiment of the invention. This drawing uses the same reference numerals for denoting the same elements as those shown in FIGS. 1 to 5. This embodiment is arranged to have the luminance signal (Y+S), which includes the synchronizing signal and the line sequential color difference signals, respectively, frequency modulated by modulation circuits 16 and 17 through switches 42 and 43. In the recording mode of the embodiment, the switch 27 is connected to the side R thereof. Then, a genlock of the synchronizing signal generation circuit 30 takes place via the vertical synchronizing signal separation circuit 28 on the basis of a synchronizing signal produced from the input processing circuit 15 together with the luminance signal. Then, the servo control circuit 26 operates in response to a synchronizing signal coming from the circuit 30. Meanwhile, the synchronizing signal generation circuit 30 is producing a pulse signal LSP1 which shifts the position of the switch LSW at the end of every H (horizontal period).

When the positions of switches 127, 23, etc. are shifted to their sides P, the genlock is applied to the synchronizing signal generation circuit 30 for synchronization with the vertical synchronizing signal included in the reproduced signal. Further, in the reproduction mode, the output of a BPF 33 is guided to a detection circuit 141 for discrimination between signals (R−Y) and (B−Y). In other words, the carrier frequency of the signal (R−Y) and that of the signal (B−Y) differ from each other. Therefore, the two can be discriminated from each other by detecting the frequency component of each frequency.

The detection output thus obtained is arranged to be produced at a high level, for example, for an H period during which the signal (R−Y) is superimposed, and at a low level for another H period during which the signal (B−Y) is produced. The detection circuit 141 thus produces a pulse signal LSP2 the level of which thus changes between a high level and a low level at the end of every H period as a discrimination signal (see FIG. 8B).

When the position of a dubbing switch 140 is shifted to a dubbing position, an interpolation process at the output processing circuit 39 stops. Then, a luminance signal and line sequential color-difference signals which are not interpolated are produced as dubbing signals and supplied via the output processing circuit, to the output terminal DOUT, which is arranged as a part of dubbing signal producing means to produce the dubbing signals. The dubbing signal producing means consists of the circuits 35 to 39 and the output terminal DOUT.

FIG. 7 shows by way of example the arrangement of the essential parts of the above-described output processing circuit. The same reference numerals are used in the drawing for denoting the same elements as those shown in FIGS. 2A and 2B.

In this example, the synchronizing signal generation circuit 30 supplies switches SW1 and SW3 and an AND gate 411 with a pulse signal V which is inverted as a discrimination signal in synchronism with a vertical synchronizing signal for every field as shown in FIG. 8A. Meanwhile, a signal from a dubbing switch 140 is arranged to be supplied to the AND gate 411. Further, from the detection circuit 141, the pulse signal LSP2 which is inverted for every H period (horizontal period) as shown in FIG. 8B is supplied to a switch SW4. The pulse signal LSP2 is arranged to be produced together with the dubbing signal from a discrimination signal output terminal LSP2-OUT arranged within the output terminal DOUT. When the dubbing switch 140 is not positioned on the dubbing side, the switch 140 produces a high level signal and the AND gate 411 is open. In this instance, the positions of the switches SW1, SW2 and SW3 are shifted to opposite positions at the end of every field.

For example, for the first field, the switches SW1 to SW3 are in connection with their sides A. Then, the luminance signal is produced after it has been delayed as much as one H period. Further, for this field, the color difference signals are obtained with their original signals and their interpolated signals alternately switched over at the end of every H period. For the second field, the positions of the switches SW1 to SW3 are shifted to their sides B. The luminance signal is then delayed as much as 0.5 H period and is skew compensated. In addition, vertical interpolation is carried out using the original signal and the signal which has been delayed by one H period. Further, the color difference signals are also skew compensated.

Meanwhile, when the position of the dubbing switch 140 is shifted to its dubbing side, a low level signal is produced from the switch to close the AND gate 411. This causes the switch SW2 to open. As a result, the same field signal is produced from the dubbing signal output terminal DOUT for both the first and second fields.

Further, since each of the line sequential color difference signals is arranged to always have the output of the 1 H delay circuit 5 which is obtained prior to the interpolation process guided to the terminal DOUT, the delayed original signal is produced. In the embodiment described, the pulse signal LSP2 is arranged to be produced from the output terminal DOUT. This arrangement enables the discrimination of the line sequential color difference signals (R−Y) and (B−Y) to be simply accomplished on the side of the dubbing arrangement.

The dubbing signal can be supplied from the dubbing signal input terminal DIN which is disposed on the side of the recording arrangement. In the case of dubbing recording, switches 142 to 144 are shifted to their sides D to allow the dubbing luminance signal YD and the dubbing line sequential color difference signals CD to be supplied to the modulation circuits 16 and 17 respectively.

Further, the pulse signal LSP2 is arranged to switch over the carrier frequency to be used at the modulation circuit 17 according to the signal (R−Y) or (B−Y).

While a special dubbing signal output terminal DOUT is arranged, in this specific example, this arrangement may be replaced by using the video signal output terminal VOUT for that purpose. The recording arrangement and the reproducing arrangement may be arranged separately.

The embodiment described is provided with the dubbing signal producing means arranged to demodulate the reproduced line sequential color difference signals and to produce the demodulated signals as dubbing signals; and the discrimination signal producing means arranged to form and produce a discrimination signal corresponding to each of the color difference signals. In dubbing the demodulated line sequential color difference signals, therefore, each of the color difference signals is discriminated from the other for dubbing. The arrangement therefore precludes the possibility of misplacing the color difference signals or having the interpolated color difference signals dubbed by mistake.

FIG. 9 shows a fifth embodiment of the invention. In this case, a reproducing apparatus according to the invention is arranged to ensure high quality dubbing even when dubbing is performed with signals obtained after interpolating the luminance signal, etc. For that purpose, a discrimination signal ID discriminates one field for which vertical interpolation is performed from another field for which the original signal is produced without interpolation and is arranged to be produced together with the dubbing video signal. This arrangement makes it possible to selectively dub only the signals which have not undergone the vertical interpolation process from among the video signals produced from the reproducing arrangement. FIG. 9 uses the same reference numerals for denoting the same elements as those shown in FIGS. 1 to 8.

The discrimination signal ID shown in FIG. 8C is formed by taking the AND of the signal V of FIG. 8A and the signal LSP2 of FIG. 8B. This signal ID is produced from a terminal IDOUT which serves as discrimination signal output means within the dubbing signal output terminal DOUT.

Further, this discrimination signal ID is arranged to be supplied via a switch 144 to the modulation circuit 16 at the time of dubbing. The modulation is carried out only when the signal ID is at a high level. Accordingly, the signal which has been vertically interpolated is never recorded.

The signal ID is arranged to be the AND signal of the signals V and LSP2 for the purpose of reducing the number of terminals. However, where an increase in the number of terminals presents no problem, these signals may be arranged to be produced from separate terminals.

What is claimed is:

1. An apparatus for reproducing color video signals from a recording medium on which the color video signals, including at least line sequential color difference signals, are recorded, comprising:
    (A) a reproduction head which traces the recording medium to reproduce the color video signals recorded on the recording medium;
    (B) interpolating means for interpolating the color video signal reproduced by said head, said interpolating means combining an undelayed line sequential color difference signal component with a delayed line sequential color difference signal component to output an interpolated color video signal; and
    (C) output means for outputting the color video signal as reproduced by said head.

2. An apparatus according to claim 1, wherein said interpolating means includes a delay circuit for delaying the line sequential color difference signal, contained in said color video signal reproduced by said head, by a period of one horizontal scanning.

3. An apparatus according to claim 1, wherein said interpolating means includes a synchronizing circuit for synchronizing the line sequential color difference signal contained in the color video signal reproduced by the head.

4. A color video signal reproducing apparatus for reproducing a color video signal recorded on a recording medium, the color video signal containing at least a line sequential color difference signal and being treated for signal recording, comprising:
    (A) a reproducing head which traces the recording medium to reproduce the color video signal recorded on the recording medium;
    (B) reproduced signal treating means, having characteristics reverse to those of the signal recording treatment, for restoring the color video signal reproduced by the head and for compensating for deterioration of the signal at the time of the reproduction;
    (C) interpolating means for interpolating the color video signal restored by the reproduced signal treating means by combining a non-delayed line sequential color difference signal component with a delayed line sequential color difference signal component to output an interpolated color video signal; and
    (D) output means for performing again a signal recording treatment of the color video signal restored by said reproduced signal treating means to output the color video signal thus treated.

5. An apparatus according to claim 4, wherein said interpolating means includes a delay circuit for delaying the line sequential color difference signal, contained in the color video signal restored by the reproduced signal treating means, by a period of one horizontal scanning.

6. An apparatus according to claim 4, wherein said interpolating means includes a synchronizing circuit for synchronizing the line sequential color difference signal contained in the color video signal restored by the reproduced signal treating means.

7. An apparatus according to claim 4, wherein said reproduced signal treating means includes an FM demodulation circuit.

8. An apparatus according to claim 4, wherein said output means includes an FM modulation circuit.

9. A method for reproducing color video signals from a recording medium recorded with color video signals containing at least line sequential color difference signals and having been already treated for signal recording, comprising:
    (A) a first step of tracing the recording medium with a reproducing head to reproduce the color video signals recorded on the recording medium;
    (B) a second step of subjecting the color video signals reproduced by the head to a reproduced signal treatment having characteristics reverse to those of the signal recording treatment to restore the color video signals and to compensate for deterioration of the signal at the time of reproduction;
    (C) a third step of interpolating the color video signal restored in the second step by combining a non-delayed line sequential color difference signal component with a delayed line sequential color difference signal component to output an interpolated color video signal; and (D) a fourth step of subjecting the color video signal restored in the second step again to a signal recording treatment to output a treated signal.

10. A method according to claim 9, wherein said reproduced signal treatment includes FM demodulation.

11. A method according to claim 9, wherein said signal recording treatment includes FM modulation.

12. A method according to claim 9, wherein said third step includes a synchronizing treatment for synchronizing the line sequential color difference signal.

13. An apparatus for reproducing color video signals from a recording medium recorded with color video signals containing at least a line sequential color difference signal and having been treated for signal recording, comprising:

(A) a reproduction head for tracing the recording medium to reproduce the color video signals recorded on the recording medium;

(B) reproduced signal treating means, having characteristics reverse to those of the signal recording treatment, for restoring the color video signal thus reproduced and for compenating for deterioration of the signal at the time of reproduction;

(C) interpolating means for interpolating the color video signal restored by the reproduced signal treating means by combining a non-delayed line sequential color difference signal component with a delayed line sequential color difference signal component to output the color video signal thus interpolated;

(D) output means for outputting the color video signal restored by the reproduced signal treating means and an indication signal corresponding to the kind of a line sequential color difference signal component in the line sequential color difference signal contained in the color video signal.

14. An apparatus according to claim 13, wherein said line sequential color difference signal is composed of an R−Y signal component and a B−Y signal component alternately issued for a period of one horizontal scanning.

15. An apparatus according to claim 14, wherein the indication signal output by the outputting means indicates whether the R−Y signal component or the B−Y signal component is contained in the color video signal.

16. An apparatus according to claim 13, wherein said reproduced signal treating means includes an FM demodulation circuit.

17. An apparatus according to claim 13, wherein said output means includes an FM modulation circuit.

18. An apparatus for reproducing color video signals from a recording medium recording with color video signals containing at least a line sequential color difference signals and having been treated for signal recording, comprising:

(A) a reproducing head for tracing the recording medium to reproduce the color video signal recorded on the recording medium;

(B) reproduced signal treating means, having characteristics reverse to those of the signal recording treatment, for restoring the color video signals reproduced by the head and for compensating for deterioration of the signals at the time of the reproduction;

(C) interpolating means for interpolating the color video signals restored by the reproduced signal treating means by combining a non-delayed line sequential color difference signal component periodically with an interpolating signal formed by a delayed line sequential color difference component to output the color video signals thus interpolated; and (D) output means for outputting an indication signal corresponding to a condition of an interpolating operation of the interpolating means together with the interpolated color video signals.

19. An apparatus according to claim 18, wherein said interpolating means includes a delay circuit for delaying the line sequential color difference signal contained in the color video signals reproduced by the head by a period of one horizontal scanning.

20. An apparatus according to claim 18, wherein said interpolating means includes a synchronizing circuit for synchronizing the line sequential color difference signals contained in the color video signals reproduced by the head.

21. An apparatus according to claim 18, wherein said reproduced signal treating means includes an FM demodulation circuit.

22. An apparatus according to claim 18, wherein said interpolating means is arranged to form an interpolating signal for each period of one horizontal scanning.

23. An apparatus according to claim 18, wherein said output means is arranged to output mutually different indicating signals alternately for a period of one horizonal scanning.

* * * * *

UNITED STATES PATENT AND TRADEMARK OFFICE
CERTIFICATE OF CORRECTION

PATENT NO. : 4,746,992

DATED : May 24, 1988

INVENTOR(S) : Seiji Hashimoto et al

It is certified that error appears in the above-identified patent and that said Letters Patent is hereby corrected as shown below:

The title of the patent should read:

--(54) Color Video Signal Reproducing Apparatus
       Utilizing Interpolation --.

Signed and Sealed this

Twenty-fifth Day of October, 1988

*Attest:*

DONALD J. QUIGG

*Attesting Officer*  *Commissioner of Patents and Trademarks*